United States Patent
Mohammad et al.

(10) Patent No.: US 11,311,835 B1
(45) Date of Patent: Apr. 26, 2022

(54) METHOD FOR CAPTURING $CO_2$ FROM EFFLUENT GASES USING A RICE-DERIVED PRODUCT

(71) Applicant: UNITED ARAB EMIRATES UNIVERSITY, Al Ain (AE)

(72) Inventors: Ameera Fares Rasheed Mohammad, Al Ain (AE); Abeer Fuad Othman Dar Saleh, Al Ain (AE); Maatouk Khoukhi, Al Ain (AE); Ali H. Al-Marzouqi, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/378,726

(22) Filed: Jul. 18, 2021

(51) Int. Cl.
*B01D 53/14* (2006.01)
*B01D 53/62* (2006.01)

(52) U.S. Cl.
CPC ......... *B01D 53/1475* (2013.01); *B01D 53/62* (2013.01); *B01D 2257/504* (2013.01)

(58) Field of Classification Search
CPC ................ B01D 53/1475; B01D 53/62; B01D 2257/504
USPC ........................................................ 423/220
See application file for complete search history.

(56) References Cited

FOREIGN PATENT DOCUMENTS

| CN | 108341676 A | 7/2018 |
| WO | WO 2017/179070 | 10/2017 |

OTHER PUBLICATIONS

Boonpoke et al., "Synthesis of Activated Carbon and MCM-41 from Bagasse and Rice Husk and their Carbon Dioxide Adsorption Capacity", Journal of Sustainable Energy & Environment 2 (2011) 77-81. (Year: 2011).*

Abang et al., "Development of carbon dioxide adsorbent from rice husk char," IOP Conference Series: Earth and Environmental Science, vol. 36, Issue 1, Jun. 2016.

Murge et al., "Adsorbent from Rice Husk for CO2 Capture: Synthesis, Characterization, and Optimization of Parameters," Energy Fuels, vol. 32, No. 10, pp. 10786-10795, Sep. 7, 2018.

* cited by examiner

*Primary Examiner* — Anita Nassiri-Motlagh
(74) *Attorney, Agent, or Firm* — Nath, Goldberg & Meyer; Richard C. Litman

(57) ABSTRACT

A method for capturing carbon dioxide ($CO_2$) from an effluent gas using a rice-derived product can include providing a rice-derived product, adjusting a pH of the rice-derived product; and contacting the effluent gas with the rice-derived product to capture the carbon dioxide from the effluent gas mixture in the rice-derived product. In an embodiment, the rice-derived product includes puffed rice grains. In an embodiment, the rice-derived product includes a rice cake. In an embodiment, the rice-derived product is loaded into a gas contact device prior to contacting withe the effluent gas.

12 Claims, 7 Drawing Sheets

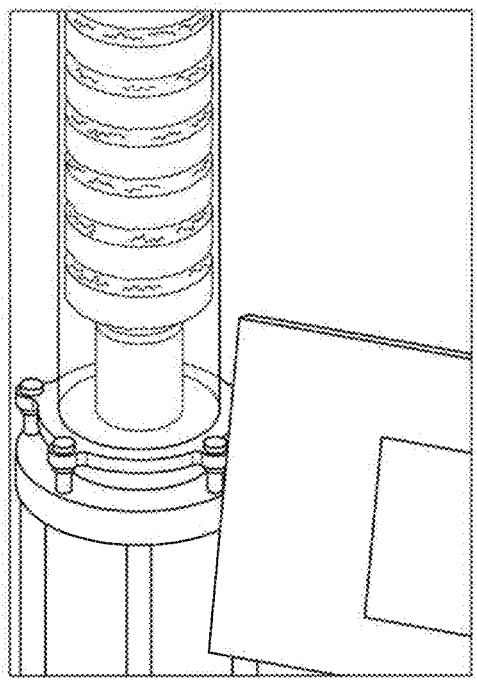 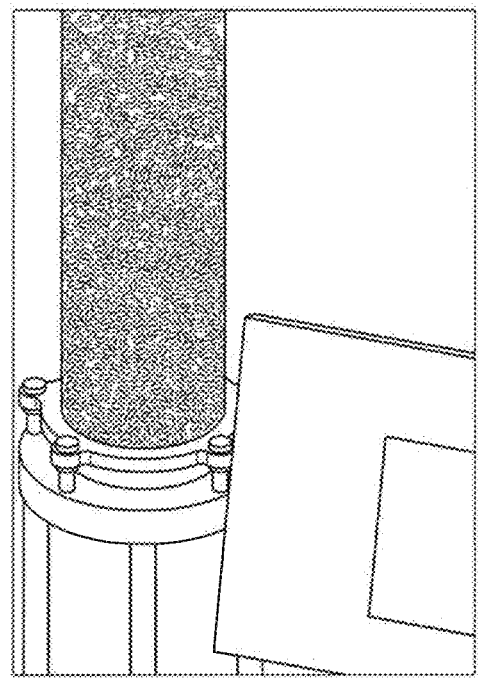
FIG. 5A  FIG. 5B
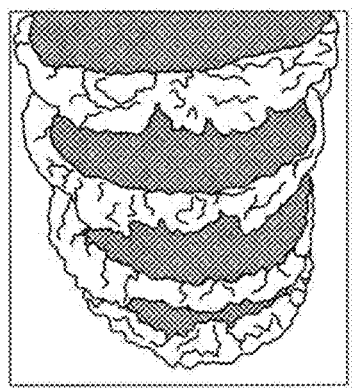 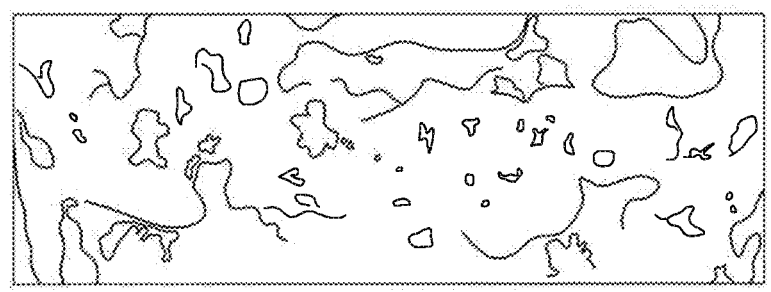
FIG. 5C  FIG. 5D

METHOD FOR CAPTURING CO$_2$ FROM EFFLUENT GASES USING A RICE-DERIVED PRODUCT

BACKGROUND

1. Field

The disclosure of the present patent application relates to food waste management and controlling CO$_2$ gas emissions, and particularly, to a method and system for capturing CO$_2$ gas from effluent gases using a rice-derived product.

2. Description of the Related Art

A primary reason for global warming is the emission of greenhouse gases, such as carbon dioxide, nitrous oxide, and methane into the atmosphere. Carbon dioxide has the largest effect on global warming because of the large quantity of carbon dioxide in the atmosphere. The rise in the earth's surface temperature is linked to the extent of carbon dioxide in the atmosphere. About half of the carbon dioxide released to the atmosphere will dissolve in the oceans and the resulting increase in acidity can have a dangerous effect on aquatic life. There are different sources of carbon dioxide emissions, such as the combustion of fossil fuels in power generation plants, industrial facilities, buildings, and transportation.

Rice waste emits around 610 million tons of CO$_2$ yearly as reported by the UN. The United Arab Emirates is one of the highest per capita consumers of rice. Around 772 million kilos of rice were imported in the UAE in 2013 making it one of the highest per capita consumers of rice in the world. About 40% of this amount is disposed of yearly.

Rice cake or puffed rice cake can be made by heating a fixed quantity of rice grains in a mould at high applied pressure. The rice grains can expand to form rice cakes in the shape of the mould in which they are contained. The rice cake properties are different from raw rice grains. Rice cakes have a smooth surface, acid-balanced factor, high porosity and high interfacial areas.

Carbon dioxide sequestration from power generation plants is a prospective technique for directing greenhouse gas emissions, as fossil fuel power plants are generating around 40% of the overall carbon dioxide emissions. Nowadays, there are four main practical approaches for CO$_2$ sequestration, including pre-combustion, post-combustion, oxy-fuel and chemical looping combustion. However, all these methods have major limitations with respect to large-scale industrial application.

The post combustion method can be classified into three groups: physical, chemical, and biochemical methods. The physical method includes physical absorption, cryogenic condensation, and membrane separation technology. The chemical method includes chemical adsorption, chemical absorption and chemical looping combustion. The biological method includes biological fixation by terrestrial vegetation and marine or freshwater microalgae.

One of the operational methods for carbon dioxide sequestration is scrubbing by reactive solvents due to its cost effectiveness and capability of treating great quantities of exhaust gas. This process is a chemical absorption process where carbon dioxide is removed from flue gases by using amine as solvent. However, the operating cost of absorption processes is high because of the high-energy consumption in regenerating the amine solutions and operation problems which may occur, such as corrosion, solvent loss, and solvent degradation.

Using high alkalinity solution for CO$_2$ capture has been known since 1943 and has been used as a pre-treatment step for cryogenic air separation. In the wet sequestration process, CO$_2$ is absorbed into sodium hydroxide solution and forms an aqueous solution of sodium hydroxide and sodium carbonate. The efficiency in contact between gas and liquid affects the absorption and hence the sequestration of CO$_2$. The most popular methods are the packed scrubbing and convective towers. A more efficient method that has been used is to generate fine spray of sodium hydroxide solution to provide large surface area to contact with the CO$_2$ gas.

CO$_2$ sequestration using sodium hydroxide produces sodium carbonate solution, which needs to be regenerated to sodium hydroxide solution again to be recycled for the process. The regeneration process "causticization" or "caustic recovery" is considered to be a very simple process using lime. However, the major drawbacks for the regeneration process are large energy consumption and limited efficiency.

Membranes are also used for selected gas separation processes such as natural gas sweetening, air separation, and hydrogen production. Such membranes should be tolerant to SO$_2$, NOx and other impurities which are present in emitted gases. Some of the limitations of membrane technology are high cost and limited life cycle.

Thus, a method for capturing CO$_2$ from effluent gases solving the afore-mentioned problems are desired.

SUMMARY

A method for capturing carbon dioxide (CO$_2$) from an effluent gas using a rice-derived product can include providing a rice-derived product, adjusting a pH of the rice-derived product; and contacting the effluent gas with the rice-derived product to capture the carbon dioxide from the effluent gas in the rice-derived product. In an embodiment, the rice-derived product includes puffed rice grains. In an embodiment, the rice-derived product includes a puffed rice cake. In an embodiment, the rice-derived product is loaded into a gas contact device prior to contacting with the effluent gas.

These and other features of the present subject matter will become readily apparent upon further review of the following specification.

BRIEF DESCRIPTION OF THE DRAWINGS

FIG. 5A shows stacked puffed rice cakes (SPRC) in an exemplary gas contact device.

FIG. 5B shows stacked puffed rice grains (PRG) in an exemplary gas contact device.

FIG. 5C shows multi-spaced puffed rice cakes (MSPRC) in an exemplary gas contact device.

FIG. 5D shows gas bubbles formed within the rice-derived product once effluent gas is passed therethrough.

DETAILED DESCRIPTION OF THE PREFERRED EMBODIMENTS

Figure 1:
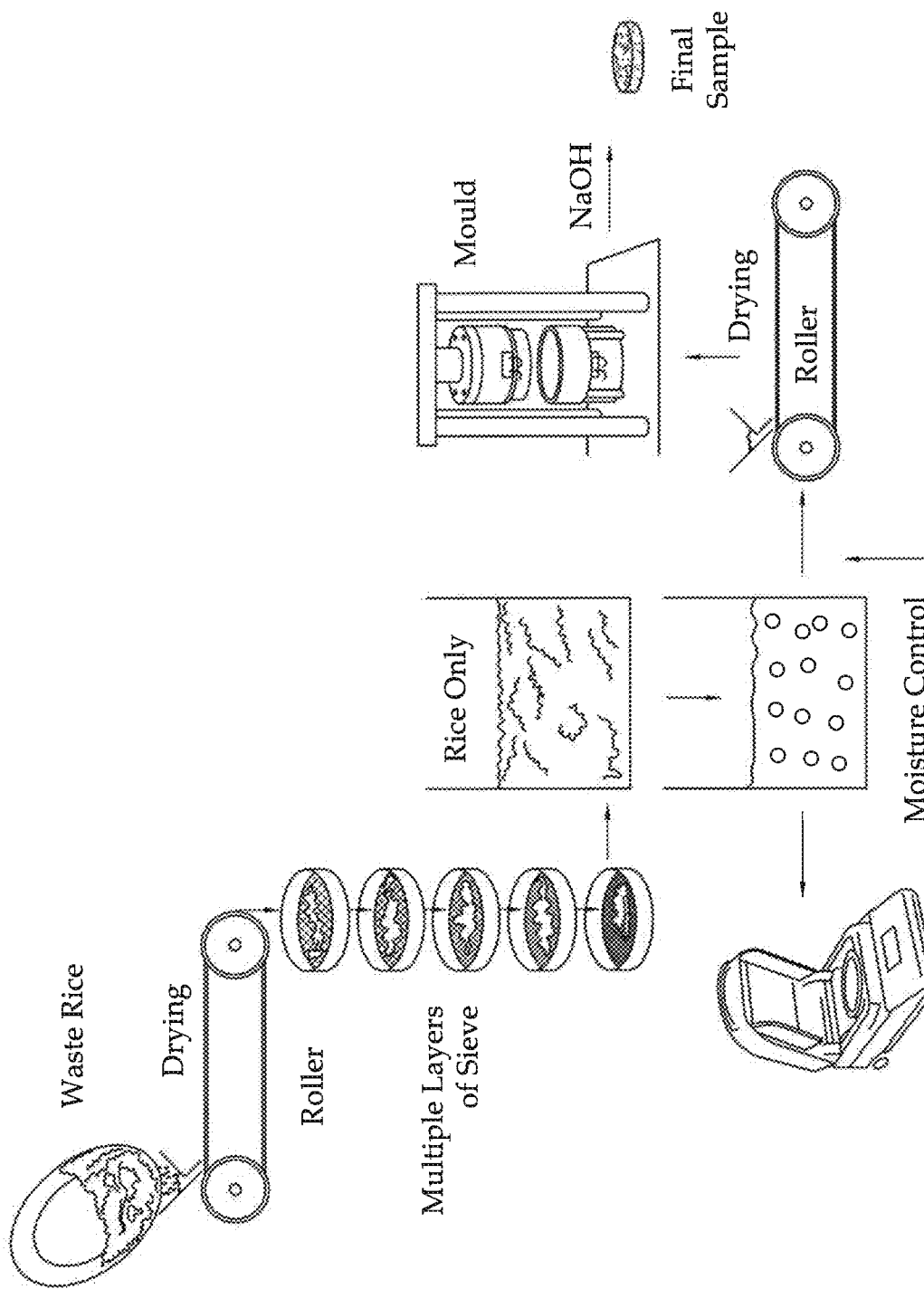
FIG. 1 is a flowchart showing a process for preparing the rice-derived product according to the present teachings.

A method for capturing carbon dioxide ($CO_2$) from an effluent gas using a rice-derived product can include providing a rice-derived product and contacting the rice-derived product with the effluent gas to capture the carbon dioxide from the effluent gas. In an embodiment, the rice-derived product has a pH value above 10. In an embodiment, the rice-derived product includes puffed rice grains. In an embodiment, the rice-derived product includes a rice cake. Both the puffed rice grains and the rice-derived product can be porous. It should be understood that "rice cake" and "puffed rice cake" are used interchangeably herein.

The rice-derived product can be prepared by subjecting waste rice grains to high temperatures. In an embodiment the waste rice grains are subjected to high temperatures, e.g., temperatures ranging from about 260° C. to about 265° C. After preparing the rice-derived product, the rice-derived product can be subject to a pre-treatment process, which includes functionalizing the rice-derived product with hydroxyl groups that allow the puffed rice structure to separate carbon dioxide from the effluent gas stream in a very efficient way. In an embodiment, the rice-derived product is buffered or adjusted to a pH that is above 10. In an embodiment, the pH of the rice-derived product is adjusted by administering NaOH liquor or NaOH solution to the rice-derived product to provide a buffered rice-derived product. The NaOH liquor can be prepared by adding sodium hydroxide to distilled water. In an embodiment, the NaOH liquor includes a total concentration of from about 0.25 M to about 2.5 M NaOH. In an embodiment, the rice-derived product is treated with the NaOH liquor at room temperature. In an embodiment, the buffered rice-derived product has a pH value more than 10.0 and a moisture content of about 5%. In an embodiment, the buffered rice-derived product has high porosity and interfacial areas.

In an embodiment, the rice-derived product can be loaded into a gas contact device and the effluent gas can be passed through the gas contact device while the rice-derived product is in the gas contact device. In an embodiment, the gas contact device is a hollow cylindrical container having opposed top and bottom ends, a peripheral wall extending between the top and bottom ends, and an opening defined in each of the top and bottom ends. In an embodiment, the puffed rice grains can be loaded into the hollow cylindrical container, thereby forming a cylindrical pile of puffed rice grains (PRG). This embodiment can provide sufficient interfacial area to accommodate gas flow rate ranges. In an embodiment, a plurality of rice cakes can be stacked within the hollow cylindrical container, thereby forming a cylindrical stack of puffed rice cakes (SPRC). As adjacent rice cakes are not separated from each other, this embodiment can provide increased levels of $CO_2$ absorption as well as increased interfacial areas.

In an embodiment, the cylindrical gas container includes a plurality of spaced mesh or perforated plates positioned within the container, e.g., along a length thereof. In an embodiment, the plates are formed from stainless steel or other suitable material. In an embodiment, two or more rods extend between the plates. In an embodiment, each rice cake is positioned on a respective plate, forming a stack of spaced rice cakes or multi-spaced puffed rice cakes (MSPRC). The space between the rice cakes can minimize pressure accumulation within the container. In an embodiment, the cylindrical gas container includes from about 10 to about 20 plates.

Once the rice-derived product is positioned in the gas contact device, an effluent feed gas can be introduced through the opening at the bottom end of the gas contact container. The effluent feed gas can include at least one of flare gas, exhaust gas, and natural gas. In an embodiment, the effluent feed gas includes about 1-10% by volume $CO_2$. The rice-derived product serves as a permeable barrier for separating $CO_2$ from the effluent feed gas mixture. The effluent feed gas passes through pores in the rice-derived product and $CO_2$ from the effluent feed gas is captured in the rice-derived product. The remaining gas stream is emitted through the opening at the top end of the gas contact container. The emitted effluent gas can have a lower content of $CO_2$ than the feed gas. In an embodiment, the rice-derived product in the gas contact device includes the puffed rice grains. In an embodiment, the rice-derived product includes a plurality of rice cakes. In an embodiment, the rice cakes have functionalized rice cake holes to facilitate dissolving the carbon dioxide and distributing other gas molecules.

Once the rice-derived product has been used or exhausted, the rice-derived product can be regenerated or recycled by application of fresh NaOH liquor and/or solutions including lime and calcium oxide. In an embodiment, the used rice-derived product can be placed in a second gas contact device to be recycled and then reused within the second gas contact device.

Figure 2A:
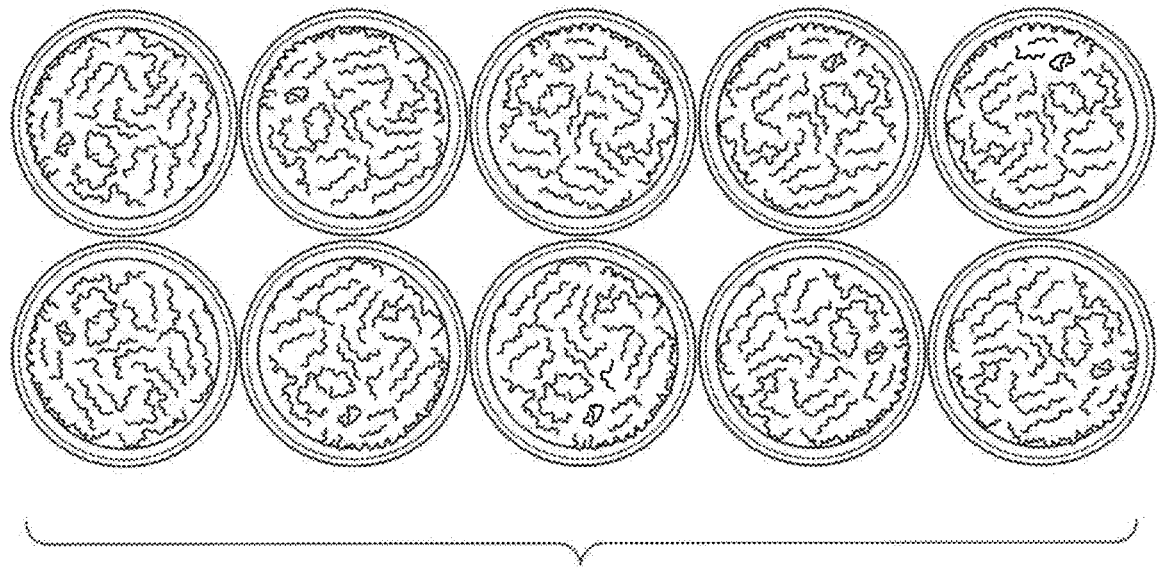
FIG. 2A shows exemplary puffed rice cakes prepared according to the present teachings.
Figure 2B:
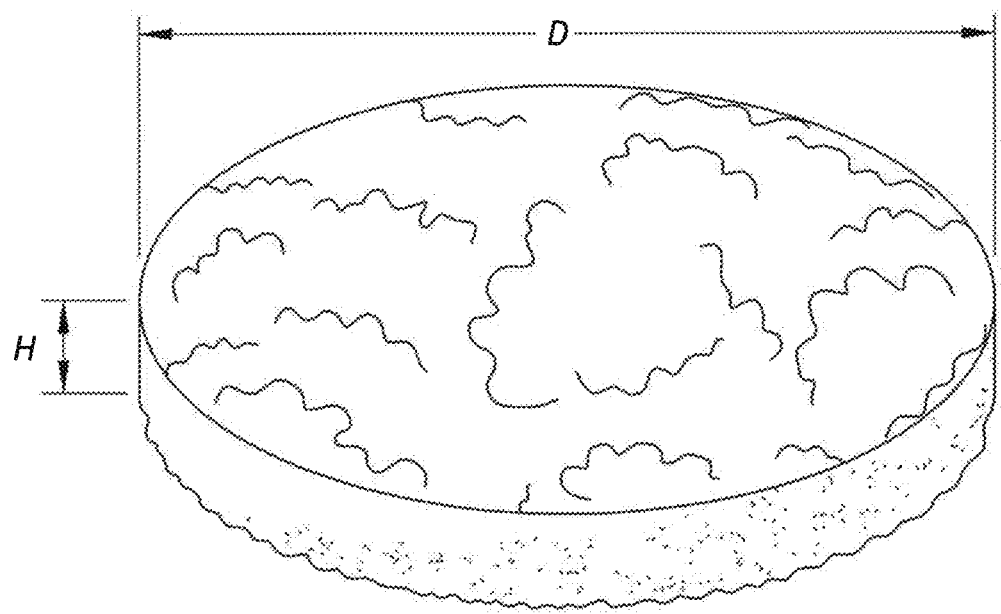
FIG. 2B shows dimensions of an exemplary puffed rice cake according to the present teachings.

As shown in FIG. 1, waste food material including rice can be dried to provide a dried rice waste material. The dried rice waste material can be filtered or passed through a sieve to eliminate impurities or non-rice material therefrom to obtain purified rice grains. The purified rice grains can be soaked in water, dried, and subjected to high temperature levels, e.g., temperatures ranging from about 260° C. to about 265° C. to provide puffed rice grains. The high temperatures decrease the moisture content in the rice grains and transform the state of the starch inside the rice grains from a hard state to a rubbery state. For preparing rice cakes, the purified rice grains can be subjected to high temperature levels, e.g., about 260° C. to about 265° C., in a mould or sealed container. A sudden application of high temperature and pressure inside the mould can cause the rice to expand and puff to provide a puffed rice cake (FIGS. 1-2B). In an embodiment, the rice cake can have a diameter (D) of about 8 cm and a thickness (H) ranging from about 9 mm to about 12 mm.

In experiment, different parameters, e.g., moisture level and temperature, were tested to optimize the thickness and the porosity of the puffed rice cakes. The temperature and pressure inside the mould during rice cake production affected the size of the pores in the rice cakes. It was found that purified rice grains having a moisture content of about 18% which are then heated to a temperature of about 260°

C. provide rice cakes with ideal porosity and a maximum thickness of about 12 mm. A diffusion coefficient of the rice cakes can also depend upon the applied temperature and pressure.

The present method of using a rice-derived product to capture $CO_2$ from effluent gases provides an efficient and sustainable method for capturing $CO_2$ that is low cost and environmentally friendly. The present method benefits food waste management sectors as well as gas emissions controlling agencies by reducing the cost and energy consumption typically associated with $CO_2$ removal. The rice-derived product has a high mass transfer area, a strong thermal and chemical resistance, as well as a high ability to be modified and functionalized to facilitate permeability and selectivity.

The present teachings are illustrated by the following examples.

Example 1

Synthesis of Rice-Derived Product

Waste rice grains were soaked in water for approximately 12 hours to reach the desired moisture level of 10%-18%. It was found that rice grains showed the best performance with respect to volume expansion ratio when the rice grains had a moisture content above 15% prior to heating. As starch can prevent grain expansion, soaking the rice grains reduces starch and/or causes starch to lose its crystallinity which makes the puffing ratio higher. After soaking, the rice grains were dried and subjected to a temperature of about 260° C. in a mould. Sudden evaporation within the rice grains lead to an inner pressure in the rice grain structure that caused the rice grains to puff and form rice cakes in the shape of the mould. Puffed rice grains were prepared using the same optimized temperature of 260° C. that was used for preparing the rice cakes but without using a mould and without applying pressure.

The pH level for the puffed rice cakes and puffed rice grains was adjusted by application of an aqueous solution of sodium hydroxide. Sodium hydroxide solutions of varying concentration levels (0.25, 0.5, 1, 1.25, 2 and 2.5 M) were prepared. A volume of 500 ml for each concentration was prepared by dissolving granular NaOH in distilled water. Rice cakes having a diameter of 80 mm and a thickness of 12 mm were dipped in each solution. Each singular rice cake absorbed about 18 ml-22 ml of sodium hydroxide solution. The rice cakes were left for 24 hours at room temperature to decrease the moisture percentage through water evaporation.

Figure 3A:
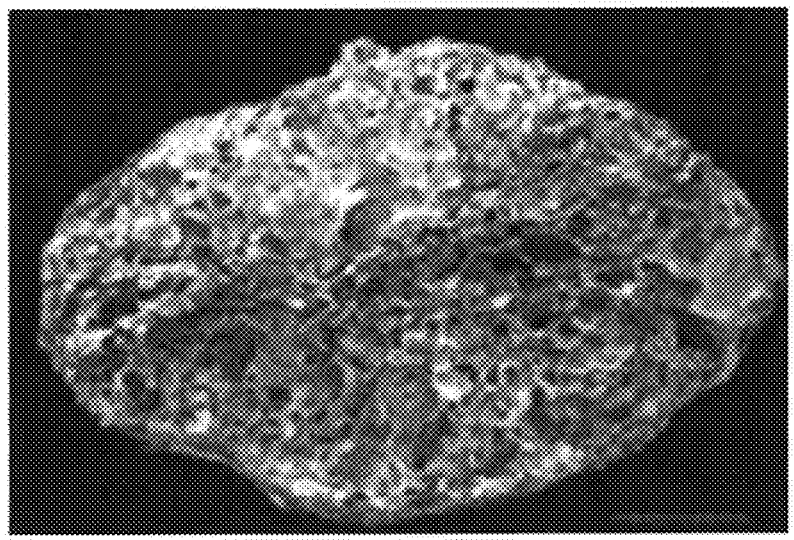
FIG. 3A is a scanning electron microscopy image of a cross-section of an exemplary puffed rice grain.
Figure 3B:
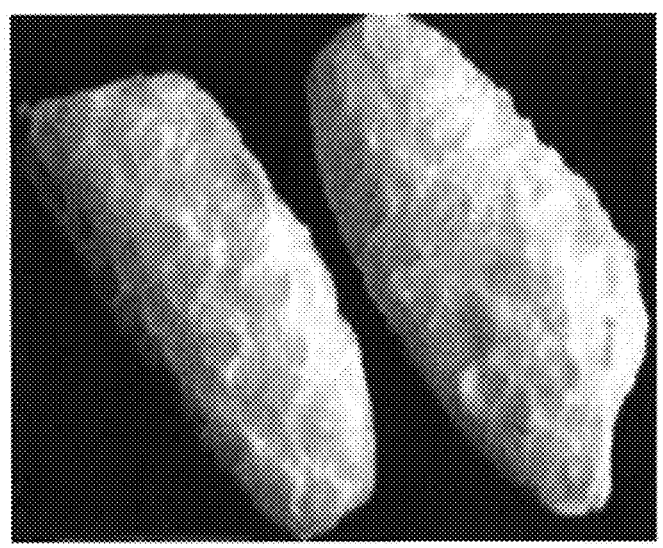
FIG. 3B is a scanning electron microscopy image of puffed rice grains.
Figure 4E:
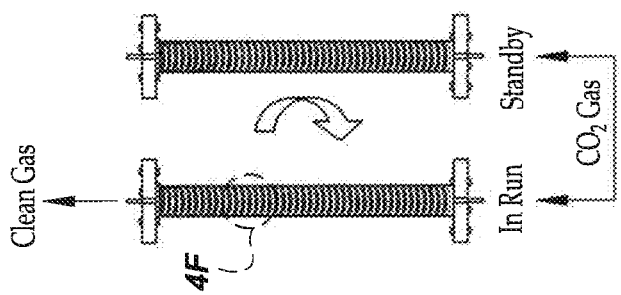
FIG. 4E-4F show puffed rice grains (PRG) in an exemplary gas contact device.
Figure 4F:
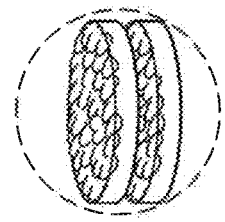
Figure 4C:
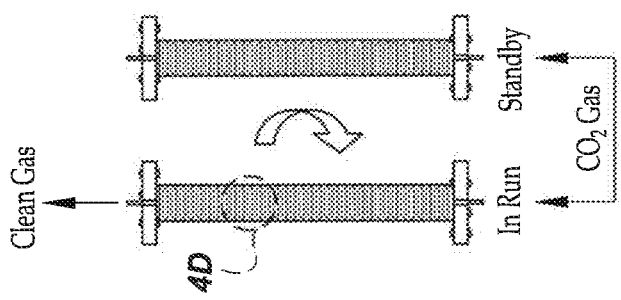
FIG. 4C-4D show stacked puffed rice cakes (SPRC) in an exemplary gas contact device.
Figure 4D:
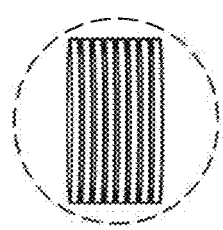
Figure 4A:
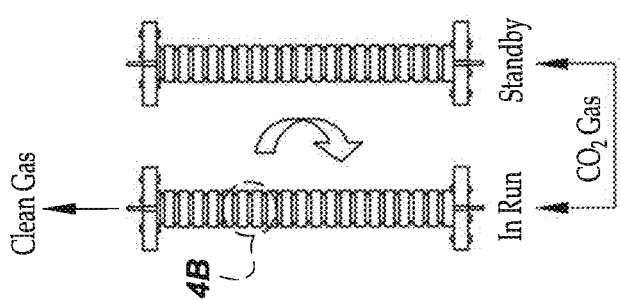
FIG. 4A-4B show multi-spaced puffed rice cakes (MSPRC) in an exemplary gas contact device.
Figure 4B:
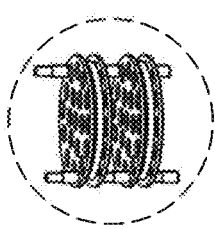

FIG. 3A shows a scanning electron microscope (MES) image of a cross-section of a puffed rice grain. As shown in FIG. 3A, voids and walls are present within the grain structure. The black channels in the grain structure, which consist of voids and gaps, can be altered by the physical pre-treatment process to achieve the desired permeation. FIG. 3B shows a scanning electron microscope (MES) image of puffed rice grains.

Example 2

Testing Rice-Derived Product

Different parameters, e.g., moisture levels and temperatures, in preparing the rice-derived product were tested to achieve a rice-derived product having optimal thickness and porosity. The experiments demonstrated that 18% moisture level and a temperature of 260° C. lead to the highest porosity and a maximum thickness of 12 mm. The results are provided in Table 1.

TABLE 1

| Proposed gas separation material at different moisture and temperature. | | |
|---|---|---|
| Moisture[%] | Temperature[° C.] | Thickness[mm] |
| 18 | 260 | 12 |
| 16 | 240 | 9 |
| 14 | 220 | 8 |
| 12 | 200 | 7 |

Example 3

$CO_2$ Removal

A gas contactor system was developed to test $CO_2$ removal efficiency of the rice-derived product. The contactor system, shown in FIGS. 4A-5D, included a cylindrical glass container having an internal diameter of 80 mm and a height of 450 mm. A gas inlet orifice having a diameter of 2 mm was defined in the center of the horizontal bottom end or base of the cylindrical container. A gas outlet orifice, having a diameter of 5 mm, was defined at the horizontal top end of the cylindrical container. The system further included a gas flow controller to control the gas flowing through the contactor system. The gas flow controller was connected to a SCADA station to provide digital monitoring and control. The container was loaded with the rice-derived product and gas effluent was passed therethrough. Gas emitted from the cylindrical container was passed to a $CO_2$ gas analyser device (Model 600 series, Non-Dispersive Infrared NDIR analysers). Details of the contactor system in different operation conditions (spaced rice cake layers, stacked rice cake layers, and puffed rice grains) are shown in FIGS. 4A-4F.

Several experiments were carried out using the stacked rice cake layers (MSPRC), puffed rice grains (PRG), and spaced rice cake layers (SPRC). For each experiment, the rice-derived products were installed inside the contactor system. A gas mixture simulating real effluent gas from refineries and industrial applications having 10% $CO_2$ and 90% air was injected through the inlet orifice. Different gas flow rates ranging from 350-750 ml/min were applied and the contactor system was operated at atmospheric pressure and room temperature. Full saturation of $CO_2$ was recorded after a specific time for each experiment to determine the maximum loading per surface area of the rice derived product.

In the first operation option, stacked layers of buffered puffed rice cakes, i.e., puffed rice cakes treated with 0.5 M NaOH liquor, having a diameter of 80 mm and a thickness of 12 mm were installed inside the gas contactor system (with 20% of total reactor volume). At time zero, the simulated effluent gas (10% $CO_2$) was injected with a flow rate of 500 ml/min and the percentage of $CO_2$ in the treated gas was recorded continuously every 15 min. The total time of 195 minutes was needed to reach full loading with $CO_2$. The moles of $CO_2$ that were absorbed and trapped by the rice cake layers was calculated according to the following equation:

Moles of CO₂ Captured $$= \frac{\int_0^t \text{volume of CO2 captured}\left(\frac{1}{\text{min}}\right)}{\text{Molar volume of CO2}\left(\frac{1}{\text{mol}}\right)} \cdot dt \quad (1)$$

It was found that 0.2722 mole of $CO_2$ was removed from a total of 0.435268 moles of $CO_2$ entering the reactor. This percentage represents around 38% removal of $CO_2$. Accordingly, three similar units in series can achieve about 100% removal of $CO_2$. Standby or replacement units should be available for use while the initial working units are regenerated.

Figure 6A:
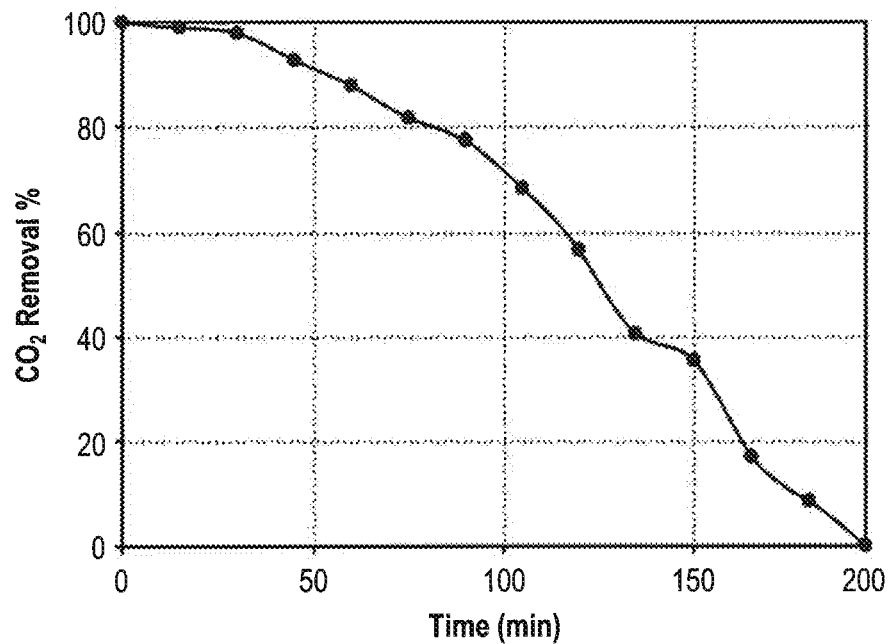
FIG. 6A is a graph showing $CO_2$ removal percentage vs. time at a gas flow rate of 500 ml/min.
Figure 6B:
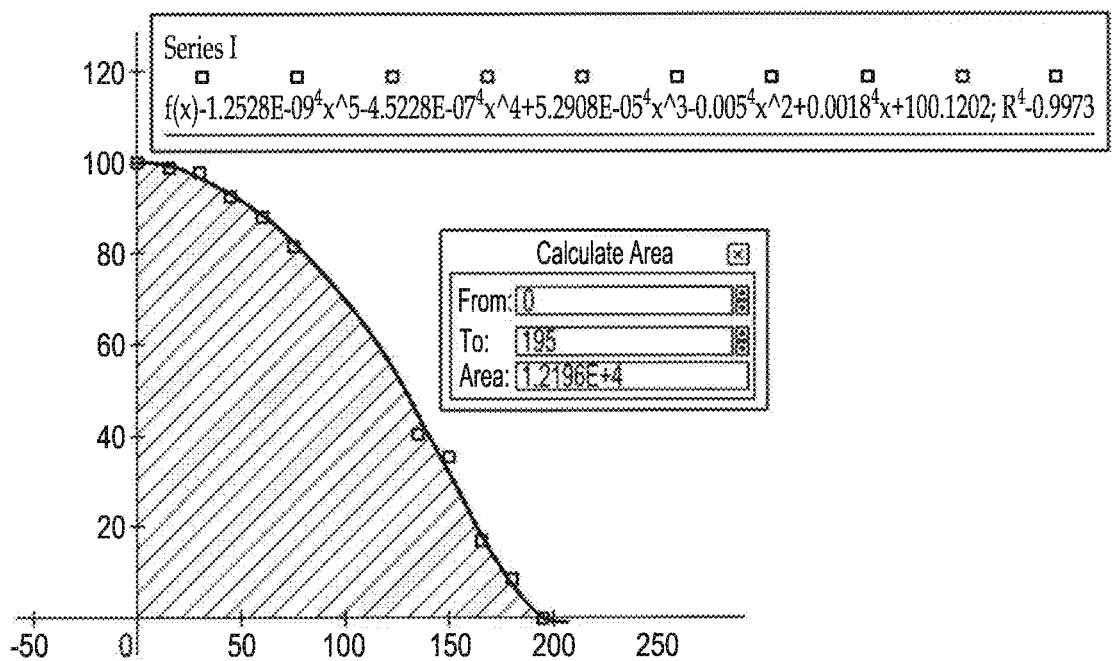
FIG. 6B is a graph showing $CO_2$ percentage in gas vs. flow time.

The $CO_2$ removal percentage was calculated and plotted for each experiment at different gas flow rates and different NaOH liquor molar concentrations. To calculate the moles of $CO_2$ removed by the rice cake layers, integration for the area under the curve ($CO_2$ percentage in the treated gas versus flow time data) was calculated by graph software (FIG. 6B) to provide the total volume of $CO_2$ loaded in the contactor media within the specific contact time as shown in FIG. 6A.

Figure 7:
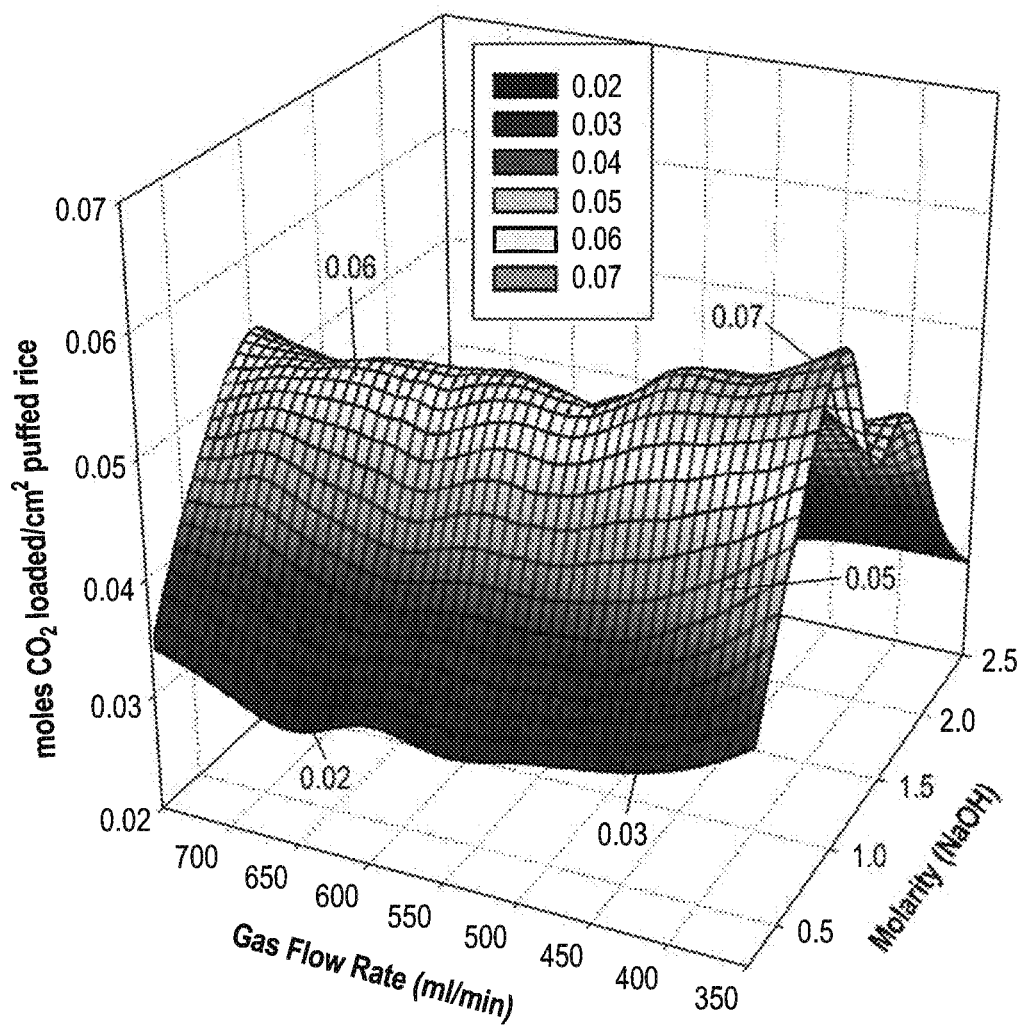
FIG. 7 is a 3D plot showing the effect of NaOH solution molarity and gas flow rate (ml/min) on $CO_2$ moles loaded per unit surface area of puffed rice.

$CO_2$ moles removed from simulated effluent gas (10% $CO_2$), can be related to each unit surface area of the rice cake as $7.52 \times 10^{-3}$ mole $CO_2/cm^2$ or 0.0168 L $CO_2/cm^2$ or 0.152 L of effluent gas/$cm^2$. This data is promising for using the treated rice cakes for $CO_2$ removal. These findings were obtained using 20 vol. % of the contact reactor system. The effect of gas flow rate and the molarity of NaOH liquor solution for each type of operation condition (MSPRC), (SPRC) (PRG) was investigated. FIG. 7 represents the effect of the mentioned factors on the $CO_2$ moles loaded per unit surface area of the puffed rice cake using the MSPRC model and with total contactor volume of 100%. It was found that using 1.5 M solution of NaOH liquor ensures a maximum $CO_2$ loading. Using low molarity of NaOH liquor (0.5 M) had a negative effect on the rice media pH level. On the other hand, using high molarity of NaOH liquor (2.5 M) caused a significant change in the rice cake structure in a way that decreased pore volume and accordingly decreased the total contact surface area. The gas flow rate also showed a reasonable effect on $CO_2$ loading, where minimum gas flow rates enhanced the $CO_2$ loading because of the increase in the residence time inside the contact system.

Example 3

Regeneration of Rice-Derived Product

Lime with different concentration of calcium oxides solutions (1-5 wt. %) was used as a method for regeneration of the rice-derived product. The percentage of $CO_2$ absorbed and captured after each regeneration process was calculated and compared with fresh cake removal. Other methods of regeneration were compared with the lime regeneration process such as regeneration with solutions prepared by waste alkaline solid materials. The waste alkaline solid materials contained high basic material (high pH value) such as steel dust slag and cement kiln dust. Regeneration using such waste solid materials can consume less energy and be more efficient than lime regeneration.

It is to be understood that the method for capturing $CO_2$ from effluent gases using a rice-derived product is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for capturing carbon dioxide from an effluent gas, comprising the steps of:
   providing a rice-derived product, the rice-derived product being selected from the group consisting of a puffed rice cake and puffed rice grains; and
   contacting the rice-derived product with the effluent gas to capture the carbon dioxide from the effluent gas.

2. The method for capturing carbon dioxide from an effluent gas as recited in claim 1, wherein the rice-derived product comprises puffed rice cake and the puffed rice cake has a diameter of about 8 cm and a thickness ranging from about 9 mm to about 12 mm.

3. The method for capturing carbon dioxide from an effluent gas as recited in claim 1, further comprising adjusting a pH of the rice-derived product prior to contacting with the effluent gas.

4. The method for capturing carbon dioxide from an effluent gas as recited in claim 1, further comprising adjusting the pH of the rice-derived product to pH 10 or greater prior to contacting with the effluent gas.

5. The method for capturing carbon dioxide from an effluent gas as recited in claim 1, wherein the rice-derived product is loaded into a gas contact device and the effluent gas is contacted with the rice-derived product in the gas contact device.

6. The method for capturing carbon dioxide from an effluent gas as recited in claim 5, wherein the rice-derived product comprises a plurality of puffed rice cakes and the plurality of puffed rice cakes are stacked together within the gas contact device.

7. The method for capturing carbon dioxide from an effluent gas as recited in claim 5, wherein the rice-derived product comprises a plurality of puffed rice cakes and the plurality of puffed rice cakes are spaced within the gas contact device.

8. A method for capturing carbon dioxide from an effluent gas, comprising the steps of:
   providing a rice-derived product, the rice-derived product being selected from the group consisting of a puffed rice cake and puffed rice grains;
   adjusting a pH of the rice-derived product prior to contacting with the effluent gas; and
   contacting the rice-derived product with the effluent gas to capture the carbon dioxide from the effluent gas.

9. The method for capturing carbon dioxide from an effluent gas as recited in claim 8, wherein the rice-derived product comprises puffed rice cake and the puffed rice cake has a diameter of about 8 cm and a thickness ranging from about 9 mm to about 12 mm.

10. The method for capturing carbon dioxide from an effluent gas as recited in claim 8, wherein the pH of the rice-derived product is adjusted to a pH value over pH 10.

11. The method for capturing carbon dioxide from an effluent gas as recited in claim 8, wherein the pH is adjusted by administering a solution of NaOH to the rice-derived product.

12. The method for capturing carbon dioxide from an effluent gas as recited in claim 8, wherein the rice-derived product is loaded into a gas contact device and the effluent gas is contacted with the rice-derived product in the gas contact device.

* * * * *